United States Patent
Yuan et al.

(10) Patent No.: US 8,673,393 B2
(45) Date of Patent: Mar. 18, 2014

(54) HYDROPHOBIC MATERIALS MADE BY VAPOR DEPOSITION COATING AND APPLICATIONS THEREOF

(75) Inventors: Jikang Yuan, Kowloon (CN); He Dong, Winchester, MA (US)

(73) Assignee: InnovaNano, Inc., Winchester, MA (US)

( * ) Notice: Subject to any disclaimer, the term of this patent is extended or adjusted under 35 U.S.C. 154(b) by 717 days.

(21) Appl. No.: 12/480,598

(22) Filed: Jun. 8, 2009

(65) Prior Publication Data
US 2012/0292256 A1 Nov. 22, 2012

(51) Int. Cl.
*C23C 16/00* (2006.01)

(52) U.S. Cl.
USPC ... 427/248.1; 427/212; 427/221; 427/255.18; 427/255.6; 427/578

(58) Field of Classification Search
USPC .......... 427/248.1, 255.18, 212, 221, 578, 569
See application file for complete search history.

(56) References Cited

U.S. PATENT DOCUMENTS

| | | | |
|---|---|---|---|
| 2,040,818 A * | 5/1936 | Badollet | 210/506 |
| 3,382,170 A | 5/1968 | Pape et al. | |
| 3,447,789 A | 6/1969 | Sharp | |
| 3,562,153 A | 2/1971 | Tully et al. | |
| 3,630,891 A | 12/1971 | Peterson et al. | |
| 3,696,051 A | 10/1972 | McGuire et al. | |
| 4,011,175 A | 3/1977 | Preus | |
| 4,022,152 A * | 5/1977 | Laufer et al. | 118/716 |
| 4,072,794 A | 2/1978 | Tomita et al. | |
| 4,175,159 A | 11/1979 | Raleigh | |
| 4,255,489 A | 3/1981 | Nielsen | |
| 4,882,225 A | 11/1989 | Fukui et al. | |
| 5,035,804 A | 7/1991 | Stowe | |
| 5,037,557 A | 8/1991 | Warrenchak et al. | |
| 5,302,570 A | 4/1994 | Newman | |
| 5,348,760 A | 9/1994 | Parker et al. | |
| 5,571,768 A * | 11/1996 | Chang et al. | 502/64 |
| 5,939,141 A * | 8/1999 | Cagliostro | 427/255.11 |
| 5,964,934 A * | 10/1999 | Englert | 106/287.1 |
| 6,045,877 A * | 4/2000 | Gleason et al. | 427/522 |
| 6,268,423 B1 | 7/2001 | Mayer et al. | |
| 6,887,578 B2 | 5/2005 | Gleason et al. | |
| 2008/0026156 A1 * | 1/2008 | Mehta et al. | 427/393.4 |

FOREIGN PATENT DOCUMENTS

WO  WO 2008/116122  *  9/2008

* cited by examiner

*Primary Examiner* — Elizabeth Burkhart
(74) *Attorney, Agent, or Firm* — Milstein Zhang & Wu LLC

(57) ABSTRACT

Methods are provided for vapor deposition coating of hydrophobic materials and applications thereof. The method for making a hydrophobic material includes providing a natural mineral, providing a silicone-based material, heating the silicone-based material to release vaporous molecules of the silicone-based material, and depositing the vaporous molecules of the silicone-based material to form a layer of the silicone-based material on surfaces of the natural mineral.

9 Claims, No Drawings

HYDROPHOBIC MATERIALS MADE BY VAPOR DEPOSITION COATING AND APPLICATIONS THEREOF

FIELD OF THE INVENTION

The present invention relates to the field of making hydrophobic and oleophilic materials. In particular, the present invention relates to vapor deposition coating on a wide variety of porous natural materials to modify their surface properties so that water repellent and selective absorption of oil from water is imparted.

BACKGROUND OF THE INVENTION

Applying a coating to materials to make them water repellent or waterproof has been practiced in various industries. For example, U.S. Pat. Nos. 4,255,489, 5,348,760, 5,964,934 and 6,268,423 have disclosed methods to coat the building material with different silicone compound, including silicone polymers, poly-metric siloxanes, reactive silane monomers, siliconates and other organic silicon-containing materials to make building materials water resistant. U.S. Pat. Nos. 2,040,818, 3,382,170, 4,175,159, and 5,302,570 have further disclosed methods to coat perlite, vermiculite or diatomite with silicone as the oil absorbent. The disclosures of U.S. Pat. Nos. 2,040,818, 3,382,170, 4,175,159, 4,255,489, 5,302,570, 5,348,760, 5,964,934 and 6,268,423 are hereby incorporated in this application by reference.

The commonality of the coating methods disclosed by the above references is the utilization of the wet-coating method, in which the silicone compound is dissolved or thinned with liquid solvent and the mixed solution or emulsion is sprayed onto the targeted mineral. Then the soaked mineral is dried at certain temperature. The silicone compound emulsion is available in commercial products, such as Dow Corning 36, 346, 39 or 349 emulsions, Union Carbide L45 emulsions, or General Electric SM 62 or 2163 emulsions, etc. In general, with the wet-coating method, the weight of the consumed silicone compound takes a few percent of the target minerals. In other words, to coat 1 ton of the porous mineral, such as perlite, would require about 5 to 40 kilograms of silicone compound to achieve a reasonable result. As shown in U.S. Pat. No. 4,175,159, if less silicone compound is used, the water repellent effect may be faded, because some surfaces may not be coated.

Another drawback with the wet-coating method is that, even using the optimized process as disclosed in U.S. Pat. No. 4,175,159, the cost of the silicone compound remains to be a significant part of the total cost for manufacturing silicone-treated porous natural minerals, as the thickness of the silicone layer generated by the wet-coating method is usually in the range of several micro meters and lots of raw materials are wasted.

Therefore, it is an object of the present invention to provide economical methods to coat the silicone on the porous natural minerals, which consumes less silicone compound and is useful for large scale manufacturing.

It is another object of the present invention to provide a method to coat silicone on the porous natural minerals that can use recycled silicone materials, such as silicone rubber mold, pipe, board, etc.

It is yet another object of the present invention to provide a method to integrate the coating process with the thermal expansion of the perlite or vermiculite so that as little energy is used as possible.

It is still a further object of the present invention to provide a method to form a uniform silicone layer on both main surface and subsurface of porous mineral grains, such that even if the grains are crushed, the hydrophobic and oleophilic attributes would remain.

SUMMARY

The present invention relates to methods for vapor deposition coating of hydrophobic materials and applications for using the materials created. In one embodiment, a method for making a hydrophobic material includes providing a natural mineral, providing a silicone-based material, heating the silicone-based material to release vaporous molecules of the silicone-based material, and depositing the vaporous molecules of the silicone-based material to form a layer of the silicone-based material on surfaces of the natural mineral. In this embodiment, the silicone-based material is a recycled silicone rubber, and it is reusable for subsequent coating on natural minerals.

In another embodiment, a method for removing oil from water includes applying a hydrophobic and oleophilic material to a body of water comprising of oil to be removed, where the hydrophobic and oleophilic material is obtained by vapor deposition coating of a silicone-based material on a natural mineral, absorbing oil using the hydrophobic and oleophilic material, and removing oil soaked hydrophobic and oleophilic material from the body of water. This method may be applied in a water treatment system of a restaurant, a municipal water treatment plant, or a petroleum refinery plant.

In yet another embodiment, a hydrophobic material includes a natural mineral, and a silicone-based material, where the silicone-based material is coated on the natural mineral through a process of vapor deposition to form a layer of the silicone-based material on surfaces of the natural mineral. The surfaces of the natural mineral include internal and external surfaces, and the layer of the silicone-based material is less than 20 nanometers. The silicone-based material includes polymerized siloxane, which further includes at least one of polydimethylsiloxane (PDMS) or a vulcanized network of PMDS.

In yet another embodiment, a building material made with hydrophobic materials obtained by vapor deposition coating of a silicone-based material on a natural mineral. The building material includes at least one of light weight and fire-rated concrete, plaster, mortar, tile, low-density breeze block, acoustic gypsum board, or loose-fill thermal insulation material.

DESCRIPTION OF EMBODIMENTS

Methods are provided for making hydrophobic materials by vapor deposition coating of a silicone-based material and applications for using the same. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

The resource of porous natural minerals such as pumice, diatomite, bentonite, zeolite, expanded perlite and vermiculite, etc., is abundant on earth. The porosity of the natural minerals may be formed either in certain natural environment or under a specific artificial condition. For example, the pumice is formed when super-heated, highly pressurized lava is violently ejected from a volcano or meet with water, when the depressurization creates bubbles and the simultaneous cooling freezes the bubbles; diatomite, also known as diatomaceous earth, is the fossilized remains of diatoms, a type of hard-shelled algae; expanded perlite is formed when raw perlite ore is heated to 850-900° C., water trapped in the structure vaporizes rapidly and causes the expansion of the material to many times of its original volume with about 90% of the volume are trapped bubbles. The pore size varies from nanometer scale, such as that in zeolite, to micrometer or even millimeter scales in pumice, perlite, etc. In general, the density of these porous mineral is far less than water. For example, the bulk density of expanded perlite can be as low as 0.03 $g/cm^3$. The surface area ranges from 0.1 $m^2/g$ to 100 $m^2/g$. The porous natural mineral is usually composed of multiple amorphous components, such as silicon dioxide, aluminum oxide, silicate, aluminate, carbonate, and other metal oxide; they are physical and chemical stable at temperature as high as 1000° C.

The availability, relative low cost, and the unique characteristics can make silicone-treated porous natural minerals according to embodiments of the present invention applicable to numerous industries, such as construction materials, filtration media, and absorbing media, etc. For example, due to its low density and thermal stability, the pumice and the expanded perlite can be used to make lightweight and fire-rated concrete, plasters, mortars, ceiling tiles or low-density breeze blocks, acoustic gypsum boards, etc. The porous structure makes the perlite and vermiculite very good thermal insulation materials, which do not settle over the time like glass fibers. Nevertheless, for these applications, a hydrophobic coating needs to be applied to the material surfaces to enable water repellency. The coating method according to embodiments of the present invention can change the surface attribute from hydrophilic to hydrophobic. Furthermore, the modified surface may become oleophilic, so that the coated porous mineral can function as the oil-selective absorbent or filter media.

The following disclosures provide economic and environment-friendly vapor deposition coating techniques by which the surface properties of a variety of materials, such as porous natural minerals, are modified from hydrophilic to hydrophobic and oleophilic. According to embodiments of the present invention, silicone polymers can offer better long term resistance to extreme environmental conditions. With appropriate formulation, the chemical, electrical and mechanical properties of silicones remain virtually unchanged at temperatures from −50° C. to 250° C. These durable polymers are unaffected by ultraviolet light or ozone and has been successfully tested in accelerated aging machines for extended periods. Silicones have a low flammability rating, so they do not support or promote flame and do not produce toxic combustion by-products. Silicones resist acids, bases, solvents, chemicals, oils and water. Silicone is also known sale to the environment. When waste silicone is in landfill, it degrades ultimately to $SiO_2$, $CO_2$ and $H_2O$. All these attributes make silicones a good candidate for hydrophobic and oleophilic applications.

According to embodiments of the present invention, using methods of vapor deposition may produce a coating layer as thin as a few nano-meters, which in turn greatly reduces the consumption of silicone in the coating process. In addition, the methods of vapor deposition provide better control over the quantity and location of the film of silicone being deposited on the target material.

According to embodiments of the present invention, cured silicone rubber may be used as the starting material to release the hydrophobic agent at certain temperature for the coating of porous natural minerals without the requirement of a catalyst or a curing agent. Cured silicone rubber is composed of vulcanized network of polymerized siloxane, for example, Polydimethylsiloxane (PDMS). High thermal stability is one of the important attributes of PDMS. The vapor pressure of PDMS is less than $10^{-3}$ mmHg at 25° C. When the cured silicone rubber is heated at an elevated temperature, for example between 100° C. and 400° C., both crosslink and scissions occur simultaneously. The crosslinking reactions produce high molecular weight chains. The scissions reactions produce low molecular weight chains.

Note that the presence of residual polymerization catalyst, curing agent, or metal oxide may change the crosslink and scissions ratio. The relative importance of these reactions varies based on the materials used and the environmental conditions. In these cases, the volatile silicone molecules in the form of short polysiloxane chains or cyclosiloxane are vaporized. When the porous natural minerals, which are mainly composed of the silicon dioxide, aluminum oxide, silicate, aluminate, and other metal oxide, present in the vapor, the polysiloxane and cyclosiloxane molecules have high affinity for the surface of the mineral grains, mainly having the metal-oxygen bonds or silicon-oxygen bonds or carbon-oxygen bonds. The vaporous molecules of polysiloxane and cyclosiloxane also enter the connected pores through the process of diffusion. Thus a conformal layer of silicone is formed on both external surface of the mineral grain and the internal surface of the pores; and the subsequent crosslinking reactions are prompted and a thin layer of hydrophobic silicone rubber is coated on both outer and inner surface of the porous natural mineral grains. The silicone rubber layer on the surface of mineral align themselves with the pores and capillary walls, whereas the polar siloxane backbone of the thin silicone rubber layer is attracted by polar surface of the mineral. The non-polar organic groups, for example the methyl group, of the silicone rubber layer are repelled by the polar surface of the minerals, and forms the hydrophobic interfaces. When silicon dioxide presents in the mineral, the affinity of the silicone rubber layer for the structurally related silicon dioxide is strengthened by the formation of chemical bonds between them.

In some embodiments of this invention, the hydrophobic coating material is cured silicone rubber, which is prepared using commercial available two-part elastomer kits, such as Dow Corning's Sylgard® 160 or 184 Silicone Elastomer. When the two liquid components are thoroughly mixed in a container, the mixture cures to a flexible elastomer at room temperature or heated temperature for accelerated cure. The cured silicone rubber and the porous natural mineral of various weight ratios between 1:1 and 1:10 are then put in an enclosed heating chamber, such as a covered glass or aluminum container, and heated at various temperatures between 100° C. and 400° C. in a furnace with automatic temperature controls for various periods of times from 10 minutes to 90 minutes. The cured silicone rubber herein can be re-used for hundreds of times. In one approach, it is observed that the elastomer becomes hardened after being used 50 times, with an average of 40 minutes each time. This is due to the degradation of the silicone rubber at the elevated temperature. However, no negative effect on the coating processes is observed. The weight lost of the silicone rubber is measured over the repeated heating processes and it is observed that the average weight lost due to the vaporization of PDMS molecules for each 60 minutes is less than 0.1%. Thus, the consumption rate of the silicone rubber may be optimized to 0.1% or lower. In other words, it consumes 1 kilogram or less silicone rubber to coat 1 metric ton of porous natural minerals using the vapor deposition method in a large scale industry manufacturing process. Since the recycled silicone materials, such as silicone rubber mold, pipe, and board, can be used as the starting materials, the material cost can be further reduced in manufacturing.

Note that the silicone vapor deposition coating method can be extended to other non-porous natural minerals, such as sand, stone, ceramic, clay, gem, etc. This method can also be used for other artificial materials, for example, silica aero gel and glass fiber, that have similar ingredient to natural mineral.

In some embodiments of this invention, the silicone vapor deposition coating process is integrated with an expanding process of perlite and vermiculite, so that the energy cost of the vapor deposition coating can be reduced or eliminated. The raw perlite or vermiculite ore is heated to 760° C. to 980° C. for expansion in the furnace. A suction fan draws the expanded particles out of the furnace and transports them pneumatically to a cyclone classifier system to be collected. The air-suspended perlite or vermiculite particles are cooled as they are transported by the air stream to the collection equipment. The cyclone classifier system separates the expanded perlite or vermiculite particles from the air stream, which is released to the atmosphere. At the collecting stage when the temperature is dropped between 200° C. and 300° C., the expanded perlite or vermiculite particles are mixed with silicone rubber in an enclosed container, so that the silicone rubber layer forms on the external and internal surface of the porous perlite or vermiculite grain.

In some embodiments of this invention, the thickness of the silicone layer formed on the porous mineral grain by the vapor deposition method is between 1 nm and 3 nm. The weight gained by the coated silicone layer is less than 0.1%. The size of the grain may vary from 0.01 um to 10 cm; the size of the pore in the porous mineral grain may vary from 1 nm to 1 cm; the surface area of the porous mineral may vary from $0.1\ m^2/g$ to $100\ m^2/g$; the bulk density of the porous mineral may vary from $0.02\ g/cm^3$ to $2\ g/cm^3$.

In some embodiments of this invention, the silicone coated porous coarse mineral grains, such as pumice or expanded perlite, by the vapor deposition method, may be crushed by external forces. It is observed that the smaller grains and fine powders as the result of crushing and grinding retain the hydrophobic and oleophilic attribute. It is because the walls between the pores are very thin; the silicone layer is formed on both external surface of the mineral grains and internal surface of the pores. Crushing the coarse grains exposes the sub-surface, which is hydrophobic.

In some embodiments of this invention, the vapor deposition of silicone rubber may be applied to fine mineral, clay or ceramic powder with the surface area varied from $0.1\ m^2/g$ to $100\ m^2/g$ to prevent the agglomeration or change the absorbability from polarized molecules to non-polarized molecules.

In some embodiments of this invention, the vapor deposition of silicone rubber is applied to pumice stone, so that it can keep floating for prolonged period of time.

One advantage of this invention comparing to prior wet-coating method is the vapor deposition coating method maintains the original porosity of the mineral grain. In wet-coating method, the viscous liquid may block the entrance of some pores and result to the degradation of absorbing capability.

Using the disclosed methods of vapor deposition coating, a variety of materials with, water-repellent attributes may be created that is suitable for various construction materials, such as lightweight and fire-rated concrete, plasters, mortars, ceiling tiles, low-density breeze blocks, acoustic gypsum boards, or loose fill thermal insulation materials, etc.

In addition, using the disclosed methods of vapor deposition coating, a variety of materials may be created with surface properties such that the affinity to non-polar molecules, for example, gasoline, is much stronger than the affinity to polar molecules, for example water. The surface area, density, form (bulk or powder, or assembled into specific shapes) vary so that they are suitable for various water cleanup applications. According to some embodiments of the invention, an oily water stream may be passed over a particulate bed made of natural minerals coated with hydrophobic materials according to vapor deposition methods described in the present disclosure. In another approach, an oily water stream may be passed through a cartridge made of the natural minerals coated with hydrophobic materials, so that the oil emulsion is filtered by the particulate bed or cartridge. These exemplary applications may be useful with a filtration system in a restaurant, in a water treatment plant, or in a petroleum refinery plant. The oil includes but not limited to crude petroleum, gasoline, diesel, kerosene, vegetable oil, animal oil, etc. The particulate bed and cartridge can be any form and shape. The amount of the coated material used in particulate bed or cartridge depends on the flow-rate of the water stream, the percentage of the oil in the water stream, and the intervening period between replacing the filtration media.

Moreover, using the disclosed methods of vapor deposition coating, surface properties of a variety of materials (natural minerals) may be modified in such a way that the resulting materials are capable of removing large quantity as well as small trace of oil/sheen on water. The method has low cost and high throughput, and the materials used are environmental-friendly. In some embodiments, perlite or vermiculite particles coated with hydrophobic materials according to vapor deposition methods described in the present disclosure may be used for oil cleanup applications. One example of such oil cleanup application is to treat the surface of ocean that is contaminated with leaked or spilled oil, such as crude petroleum, gasoline, diesel, kerosene, etc. The coated perlite or vermiculite particles may be spread over the contaminated water in loose form or contained in woven bags. The coated perlite or vermiculite particles absorb the leaked oil and float on the water so that they can be removed. One kilogram of the coated perlite or vermiculite particles may treat up to ten kilograms of oil. In other applications, coated pumice powders prepared by the present disclosure may be used to spread over the surface of the water that is contaminated with leaked or spilled oil. The pumice powders absorb the oil, agglomerate into large blocks, then sink to the bottom of the water and become harmless to the environment.

Note that the hydrophobic and oleophilic coated natural minerals and the oils being absorbed may be recycled according to embodiments of the present invention. In one approach, if the hydrophobic and oleophilic coated natural minerals have absorbed a volatile oil, such as gasoline or diesel, the compound may be heated to the boiling point of the absorbed oil (e.g. gasoline) allowing the absorbed oil to evaporate and be collected. The hydrophobic and oleophilic coated natural minerals may then be dried and reused. In another approach, if the hydrophobic and oleophilic coated natural minerals have absorbed a non-volatile oil, such as vegetable oil or animal oil, the compound may be mixed with an organic solvent, for example ethanol. In this case, the absorbed vegetable or animal oil is released because the affinity of the ethanol molecules to the hydrophobic and oleophilic coating layer is stronger than the affinity of the vegetable or animal oil molecules to the hydrophobic and oleophilic coating layer on the surfaces of the natural minerals. The natural minerals am heated to release the ethanol, and then be dried and reused.

Example 1

Approximately ten grams (10 g) of Dow Corning Sylgard® 184 Part A and 1 g of part B are mixed in a vinyl container and left in room temperature for about 48 hours until it cures. The cured silicone rubber is removed from the vinyl container and cut into small pieces, weights approximately 1 g each. 1 g cured silicone rubber and 1 g expanded perlite with grain size range from 3 mm to 6 mm are then put in a covered glass plate, which is then heated at about 250° C. in a furnace with digital thermometer for about 10 minutes to get the sample A, for 30 minutes to get sample B, and for 60 minutes to get sample C. The three samples are submerged into approximately 100 ml tap water for 5 minutes and removed from the water. By measuring the weight of the samples before submerged into water and after removed from water, the gained weight represents the water retained by the samples. It is observed that Sample A gained approximately 20%, Sample B and C gained approximately 5 percent. The gained weight varied slightly among different batches of the same set of experiments.

Then the perlite grains of Sample A, B and C are crushed and casted into water again. It is observed that some powder from sample A is sunk into water, while it does not happen for B or C.

This example shows the maximum water repellent capability is reached after a certain period of time of the vapor coating, in this case less than 30 minute.

Example 2

Use the cured silicone rubber prepared in Example 1. 1 g of PDMS and various amount of expanded perlite are put into covered glass containers respectively and heated at about 250° C. for about 30 minutes. Sample A has 1 g perlite. Sample B has 2 g perlite, and sample C has 5 g perlite. The coated perlite A, B and C do not show significant difference of water retaining ability.

This example shows the weight ratio between the silicone rubber and perlite doesn't affect the coating result.

Example 3

Use the cured silicone rubber prepared in Example 1. Approximately 1 g PDMS and 1 g expanded perlite are put into covered glass containers respectively and heated at various temperatures for about 30 minutes. Sample A is heated at 100° C. Sample B is heated at 150° C. Sample C is heated at 200° C. Sample D is heated at 250° C. Sample E is heated at 300° C. Sample F is heated at 350° C. Sample G is heated at 400° C. The seven samples are submerged into approximately 100 ml tap water for 5 minutes and removed from the water. By measuring the weight of the samples before submerged into water and after removed from water, the gained weight represents the water retained by the samples. It is observed that Sample A gained approximately 250%, Sample B gained approximately 210%, Sample C gained approximately 130%. Sample D, E, F and G gained approximately between 5% and 10%. It is also observed that the PDMS used in the Sample E and F shown signs of wearing-out after 30 minutes and the PDMS used in Sample G was worn out quickly.

This example shows the maximum water repellent capability can be achieved at the temperature about 250° C. and higher for the PDMS (Dow Corning Sylgard® 184) used in this example. However if the tempera rare is too high, the reusability of the PDMS is shortened. Note that the optimum temperature may be different for other silicone rubber materials.

Example 4

Use the cured silicone rubber prepared in Example 1 and finely grounded diatomite powder. Heat the cured silicone rubber and the grounded diatomite powder at about 250° C. for 30 minutes. The coated diatomite powder is casted on to 100 ml tap water. Stirring. There is no visual sign of mixing of the coated powder and the water. Leave the coated powder on the surface of the water for about a month. There is still no sign of mixing the powder and the water.

As a comparison, uncoated diatomite powder is casted onto the water, which quickly sunk to the bottom of the water.

This example shows the vapor deposition coating is an effective method to water-proof the fine powder of natural minerals, such as clay, etc.

Example 5

This example demonstrates the oil absorbability of the coated expanded perlite. An oil-water emulsion is prepared by mixing 10 ml of tap water and 0.5 ml of vegetable oil in a 24 ml glass vial. The oil is died by a blue solvent to magnify the visual effect. Shake the vial forcefully for 30 second. Then 0.2 g coated expanded perlite grain prepared in Example 2 is casted on the surface of the emulsion. Shake the vial again for 30 seconds. Most oil is absorbed by the silicone coated expanded perlite and there is no trace of blue color in the water by visual inspection. The oil soaked expanded perlite is still floating on the surface of the water.

As a comparison, the uncoated expanded perlite is used, and it is observed that the perlite does not absorb any oil due to the presence of the water and the affinity of the water molecules and the uncoated perlite surface is stronger than the affinity of oil and uncoated perlite surface.

Similar experiments are performed by using the gasoline instead of the vegetable oil. And the similar results are observed.

Example 6

The same as Example 5, except using silicone coated pumice powder in the place of coated perlite. The pumice powder absorbed most oil and agglomerated into large blocks and sunk to the bottom of the water.

Similar experiments are performed by using the gasoline instead of the vegetable oil. And similar results are observed.

Example 5 and Example 6 show some effective methods to remove the leaked petroleum from the ocean. One method is to use the silicone rubber coated perlite to selectively absorb the leaked oil, then remove the oil soaked perlite. Another method is to use the silicone rubber coated pumice powder. The oil soaked pumice powder sinks to the bottom of the ocean.

Example 7

The oil soaked perlite grains in Example 5 is removed from the water, and dried in room temperature, then is casted into a vial contain 10 ml 99.9% ethanol. The oil is released from the perlite and sunk to the bottom of the ethanol. The perlite grains are then removed from the ethanol and dried in 60° C. The result perlite still show character of hydrophobic and oleophilic.

This example shows a method to recycle the absorbed oil and reuse the silicone coated materials.

Example 8

Two grams (2 g) of silicone rubber coated perlite grain prepared in Example 2 is put into a sieve of 5 cm in diameter and a collector is put under the sieve. The oil-water emulsion prepared in Example 5 is poured onto the coated perlite. The water collected by the collector under the sieve shown no trace of oil by visual inspection.

This example provided a method to remove the oil or other hydrocarbon, such as gasoline, diesel, etc. from water by filtration.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A method for making a hydrophobic material, comprising:
    providing a porous natural mineral comprising perlite or vermiculite;
    providing a silicone-based material comprising vulcanized network of polymerized siloxane;
    heating the silicone-based material in an enclosed chamber to release vaporous molecules of the silicone-based material; and
    depositing the vaporous molecules of the silicone-based material to form a layer of hydrophobic material on surfaces of the natural mineral,
wherein the method is performed in the absence of a catalyst or a curing agent.

2. The method of claim 1, wherein the silicone-based material is reusable for subsequent coating on natural minerals, and the silicone-based material comprising vulcanized network of polymerized siloxane is recycled.

3. The method of claim 1, wherein heating the silicone-based material causes a crosslinking reaction.

4. The method of claim 1, wherein heating the silicone-based material causes a scissions reaction.

5. The method of claim 1, wherein heating the silicone-based material comprises heating to a predetermined temperature between 100° C. and 400° C. inclusive.

6. The method of claim 5, wherein heating the silicone-based material comprises heating to a pressure for vapor deposition between 0.5 to 2 atmospheres inclusive.

7. The method of claim 1, wherein providing the natural mineral comprising perlite or vermiculite comprises:
    heating the natural mineral comprising perlite or vermiculite to a temperature between 760° C. and 980° C. inclusive to an expanded form in a furnace;
    transferring the expanded natural mineral pneumatically to a cyclone classifier;
    collecting classified natural mineral with a collection equipment; and
    cooling the classified natural mineral to a temperature between 100° C. and 400° C. inclusive.

8. The method of claim 1, wherein depositing the vaporous molecules comprises at least one of: physical vapor deposition, chemical vapor deposition, and plasma enhanced vapor deposition.

9. The method of claim 1, wherein the porous natural mineral comprises one or more of: silicon dioxide, aluminum oxide, silicate, aluminate and carbonate.

* * * * *